(12) United States Patent
Lunt (10) Patent No.: US 9,663,131 B1
(45) Date of Patent: May 30, 2017

(54) WHEELBARROW

(71) Applicant: Warner Lunt, Tallahassee, FL (US)

(72) Inventor: Warner Lunt, Tallahassee, FL (US)

( * ) Notice: Subject to any disclaimer, the term of this patent is extended or adjusted under 35 U.S.C. 154(b) by 0 days.

(21) Appl. No.: 15/137,966

(22) Filed: Apr. 25, 2016

(51) Int. Cl.
*B62B 1/20* (2006.01)
*B62B 1/18* (2006.01)

(52) U.S. Cl.
CPC .............. *B62B 1/208* (2013.01); *B62B 1/186* (2013.01); *B62B 2301/08* (2013.01)

(58) Field of Classification Search
CPC .. B62B 1/18; B62B 1/186; B62B 1/20; B62B 1/208; B62B 2301/08
USPC ................................................ 280/47.2, 659
See application file for complete search history.

(56) References Cited

U.S. PATENT DOCUMENTS

| | | | |
|---|---|---|---|
| 600,476 A | 3/1898 | Burt | |
| 602,504 A | 4/1898 | Garver | |
| 605,316 A | 6/1898 | Kneeland | |
| 931,096 A | 8/1909 | Todd | |
| 1,095,145 A | 4/1914 | Ellerich | |
| 1,255,128 A * | 2/1918 | Bayley | B62B 1/18 |
| | | | 280/43.24 |
| 1,735,527 A | 11/1929 | Cwik | |
| 2,598,261 A | 5/1952 | Hrabel | |
| 4,061,349 A * | 12/1977 | Stahl | B62B 1/20 |
| | | | 280/47.2 |
| 6,220,622 B1 | 4/2001 | Garcia | |
| 7,547,026 B2 * | 6/2009 | Morris | B62B 1/18 |
| | | | 280/47.31 |

* cited by examiner

*Primary Examiner* — John Walters
(74) *Attorney, Agent, or Firm* — Adrienne C. Love (57) ABSTRACT

The present invention comprises a wheelbarrow for use on a surface. The wheelbarrow is generally comprised of a first and second handle, a receptacle, a chassis, at least one leg, a front wheel, a back wheel and an assembly. The assembly includes a on which allows back wheel to pivot between a first position and a second position. When the back wheel is in the first position, the legs are in contact with the surface. When the back wheel is in the second position the legs are raised off of the surface.

10 Claims, 7 Drawing Sheets

WHEELBARROW

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKSURFACE OF THE INVENTION

1. Field of the Invention

This invention relates to wheelbarrows. More specifically, the invention comprises a new wheelbarrow system for improving the maneuverability of a wheelbarrow.

2. Description of the Related Art

Wheelbarrows are often used in gardening and construction to carry heavy or bulky loads that would otherwise be difficult to carry without assistance. A wheelbarrow is generally a hand-propelled vehicle with only one wheel. It is generally comprised of a barrel, a front wheel, two legs and two handles. The wheelbarrow is able to distribute a load between a front wheel and the operator, when the operator lifts, by way of the handles, the legs off of the surface.

Even with as distributed load, an operator still must bear a large portion of the load and simultaneously push the device forward. However, replacing the wheelbarrow legs with additional wheels would cause the wheelbarrow to be unstable in a resting position Therefore, what is needed is a wheelbarrow which allows the wheels to accept a larger portion of the load when the wheelbarrow is being moved by the operator but allows the operator to stabilize the wheelbarrow on its legs in a resting position. The present invention achieves this objective, as well as others that are explained in the following description.

BRIEF SUMMARY OF THE INVENTION

The present invention comprises a wheelbarrow for use on a surface to carry a load. The wheelbarrow is generally comprised of a first and second handle, a receptacle, a chassis, at least one leg, a front wheel, a back wheel and an assembly having a joint. The joint, preferably a hinge joint, allows back wheel to pivot between a first position and a second position. When the back wheel is in the first position, the legs are in contact with the surface. When the back wheel is in the second position the legs are raised off of the surface.

In the second position, the back wheel allows the user to push and pull the wheelbarrow, while the first and second wheel bear the bulk of the weight of the load. When the user would like to stop the wheelbarrow, the second wheel can easily pivot from the second position into the first position. In the first position the legs of the wheelbarrow contact the ground thereby stabilizing the wheelbarrow.

REFERENCE NUMERALS IN THE DRAWINGS 10 wheelbarrow
12 receptacle
14 front wheel
16 back wheel
18 first handle
19 second handle
20 legs
22 grip
24 chassis
26 back wheel folk
28 assembly
30 member
32 surface
34 mounting shaft
36 receptacle support member
38 joint
40 spherical joint
42 front wheel fork
46 fork stop
48 opening
50 locking pin
52 bushing
54 nut
56 chassis member
58 crossbar

DETAILED DESCRIPTION OF THE INVENTION

Figure 1:
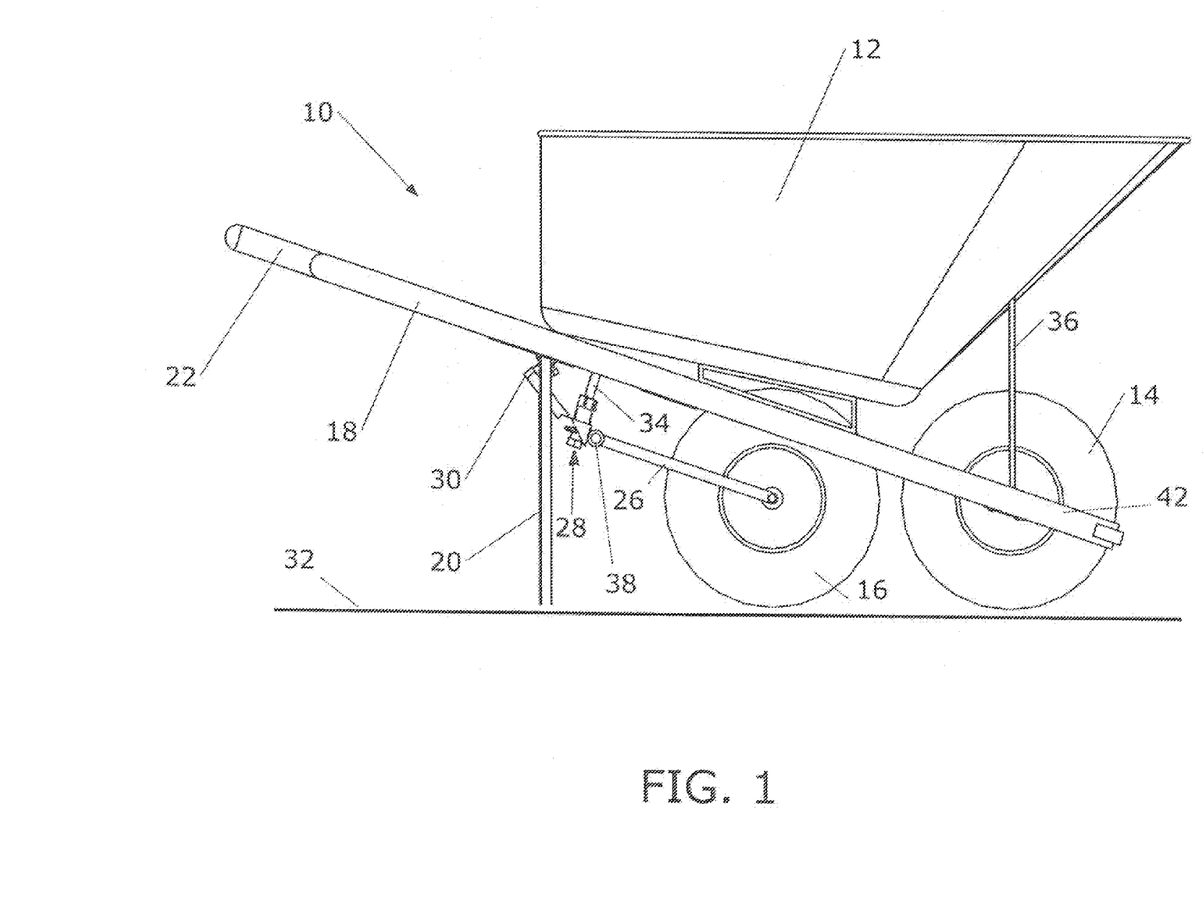
FIG. 1 is a perspective view, showing the present invention.

The present invention provides a wheelbarrow having an extendable wheel, which assists in supporting the weight of the load within the wheelbarrow. A preferred embodiment of the present invention is shown in FIG. 1. Wheelbarrow 10 comprises receptacle 12, front wheel 14, first handle 18, second handle 19 (not visible), legs 20, grip 22, front wheel fork 42, and receptacle support member 36. First and second handles 18, 19 have a first end and a second end. The first end of handles 18, 19 is located proximate grip 22, while the second end is located proximate front wheel 14. Optionally, crossbar 58 can connect first handle 18 to second handle 19 at second end. In this embodiment of the present invention, first and second handles 18, 19 and front wheel fork 42 are a single part. This is common with a typical prior art wheelbarrow. However, wheelbarrow 10 should not be limited to such a design. In other embodiments, front wheel fork 42 may be directly attached to receptacle 12 or chassis 24 of wheelbarrow 10. While wheelbarrow 10 is stationary, legs 20, front wheel 14 and back wheel 16 support wheelbarrow 10. Back wheel 16 is shown in a first position, pivoted forward close to receptacle 12. Receptacle support member 36 provides additional support to receptacle 12.

Wheelbarrow 10 also includes back wheel 16, back wheel fork 26 and assembly 28. Assembly 28 can be any assembly which allows back wheel to pivot from a first position to a second position, as described herein. Assembly 28 is generally comprised of member 30, mounting shaft 34, and joint 38. More specifically, assembly 28 is comprised of member 30, mounting shaft 34, joint 38, mounting plate 44 (having a lurk stop 46), spherical joint 40, locking pins 50, bushing 52 and nut 54. As shown, back wheel 16 is attached to back wheel fork 26. Back wheel fork 26 is attached to assembly 28 via a joint 38. Joint 38 may take many forms. One such form is a simple barrel hinge joint. Any joint that allows a single degree of freedom (rotating around a single axis) would suffice for joint 38.

Figure 2:
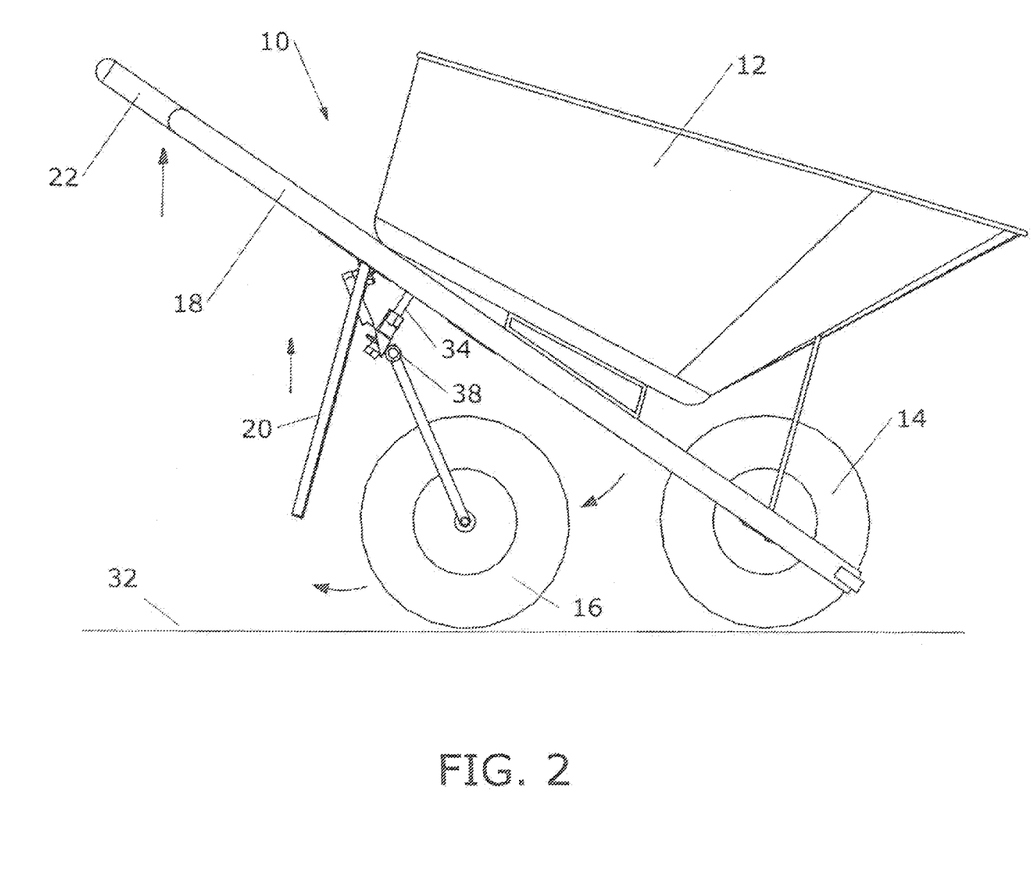
FIG. 2 is a perspective view, showing the present invention.

FIG. 2 shows wheelbarrow 10 in a configuration as the user begins to lift upwards on grips 22. This is indicated by the upward arrow. As the user lifts grips 22, handles 18, 19, pivot about front wheel 14, which remains on the surface 32 (actually pivoting on the axle of front wheel 14). This lifts legs 20 up off of surface 32, thereby allowing back wheel 16 to pivot into a second position (shown in FIG. 3) as indicated by the arrows. Due to joint 38, back wheel 16 begins to rotate clockwise about joint 38 (in the current view) as the user lifts handles 18, 19 upwards. While in the position shown in FIG. 1, surface 32 prevents back wheel 16 from extending. However, as wheelbarrow 10 is lifted, back wheel 16 is able to pivot and extend downwards (thereby pushing legs 20 upwards). In the present embodiment, back wheel 16 pivots due to the weight of the back wheel 16.

Figure 3:
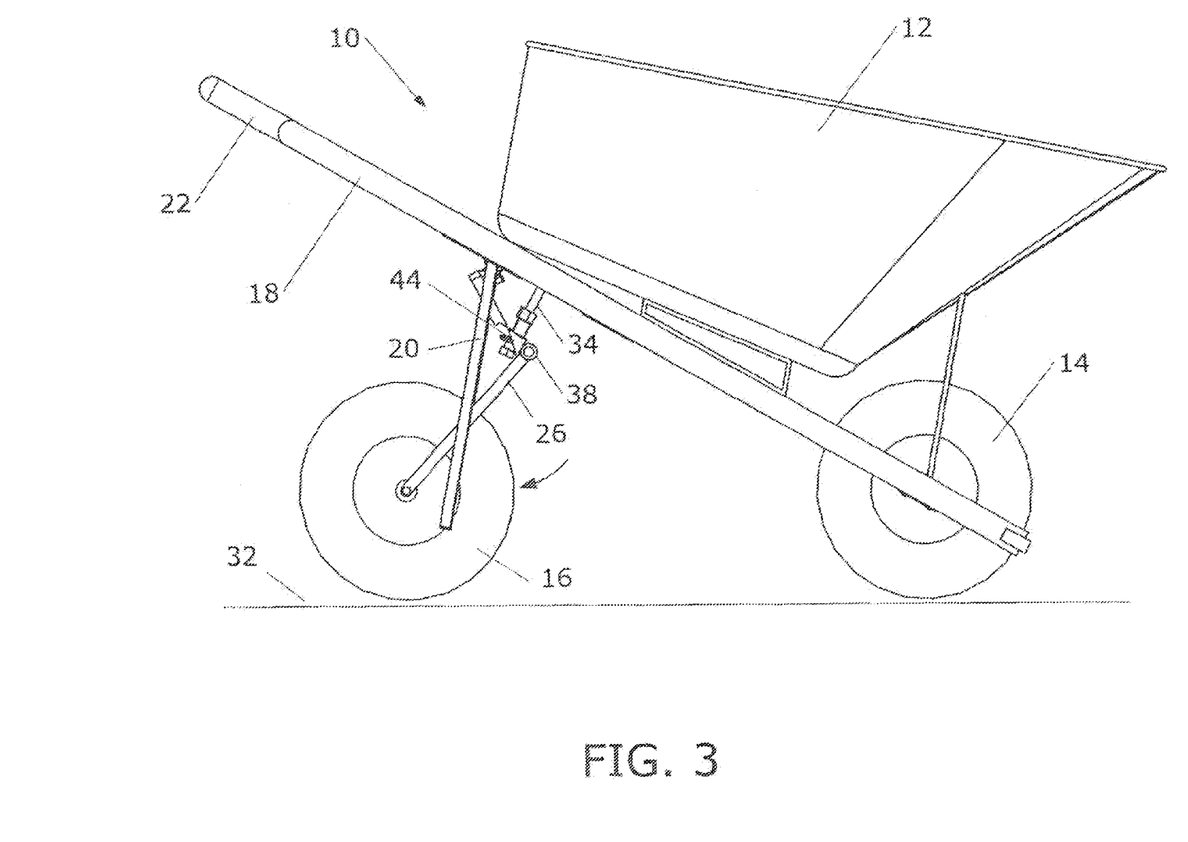
FIG. 3 is a perspective view, showing the present invention.

As the user continues to lift upward upon grips 22 and handles 18, 19, front wheel 16 continues to rotate clockwise about hinge joint 38. Once back wheel fork 26 is vertical (perpendicular to the surface 32), the user lowers, while simultaneously pushing forward on, wheelbarrow 10 in order to force back wheel 16 to a slightly hyper-extended position. Although the user may assist the back wheel 16 into position, the back wheel 16 will generate a certain amount of centripetal force when the user lifts the wheelbarrow 10. The back wheel 16 will maintain its velocity and circular pats clockwise about hinge joint 38. The velocity, in some instances, carries the back wheel 16 to the hyper-extended position, without requiring the use to push forward on wheelbarrow 10. FIG. 3 shows the position of back wheel 16, back wheel fork 26, and legs 20 which allow the user to maneuver wheelbarrow 10 without lifting any of the load created by wheelbarrow 10 or the contents of wheelbarrow 10. As shown, back wheel fork 26 forms an angle with surface 32 which is less than 90 degrees. While in this position, back wheel 16 remains in this position until wheelbarrow 10 is lifted and pulled backwards slightly. Thus, hack wheel 16 does not inadvertently retract upwards while in use. The reader will note that even if back wheel 16 inadvertently or suddenly retracted upwards while in use, wheelbarrow 10 would simply fall upon legs 20. This would cause no harm the user or the contents of wheelbarrow 10.

It is preferable for back wheel fork 26 to extend such that the angle formed between back fork 26 and the surface 32 is less than 90 degrees (as shown FIG. 3). However, it is also preferable to have stop in place it order to prevent back wheel fork 26, and therefore back wheel 16 from rotating so much that legs 20 can reach surface 32. In most instances, an angle formed between fork 26 and surface 32 is preferably between 30 and 60 degrees. An angle of less than 30 degrees would risk wheel legs 20 impacting surface 32 during maneuver of wheelbarrow 10. An angle of greater than 60 degrees would risk back wheel 16 retracting at undesirable moments. In the present embodiment, mounting plate 44 acts as this stop. Back wheel fork 26 rotates clockwise, until fork 26 engages mounting plate 44, as shown in FIG. 3. Mounting plate 44 prevents back wheel 16 from continuing to rotate clockwise about hinge joint 38.

Those familiar with the art will realize the advantage of this system. A typical prior art wheelbarrow acts as a lever. The user uses a mechanical advantage created by handles 18, 19 and front wheel 14 in order to lift a load that the user normally would not be capable of (at least for long distances). However, the user still must lift a significant portion of the load using a typical wheelbarrow. The present invention couples the maneuverability of a typical prior art wheelbarrow without the need to lift the load contained in the wheelbarrow for extended periods. In addition, when the user desires to set wheelbarrow 10 on legs 20 in order to unload or perform another task, back wheel 16 is easily folded up and out of the way.

Figure 4:
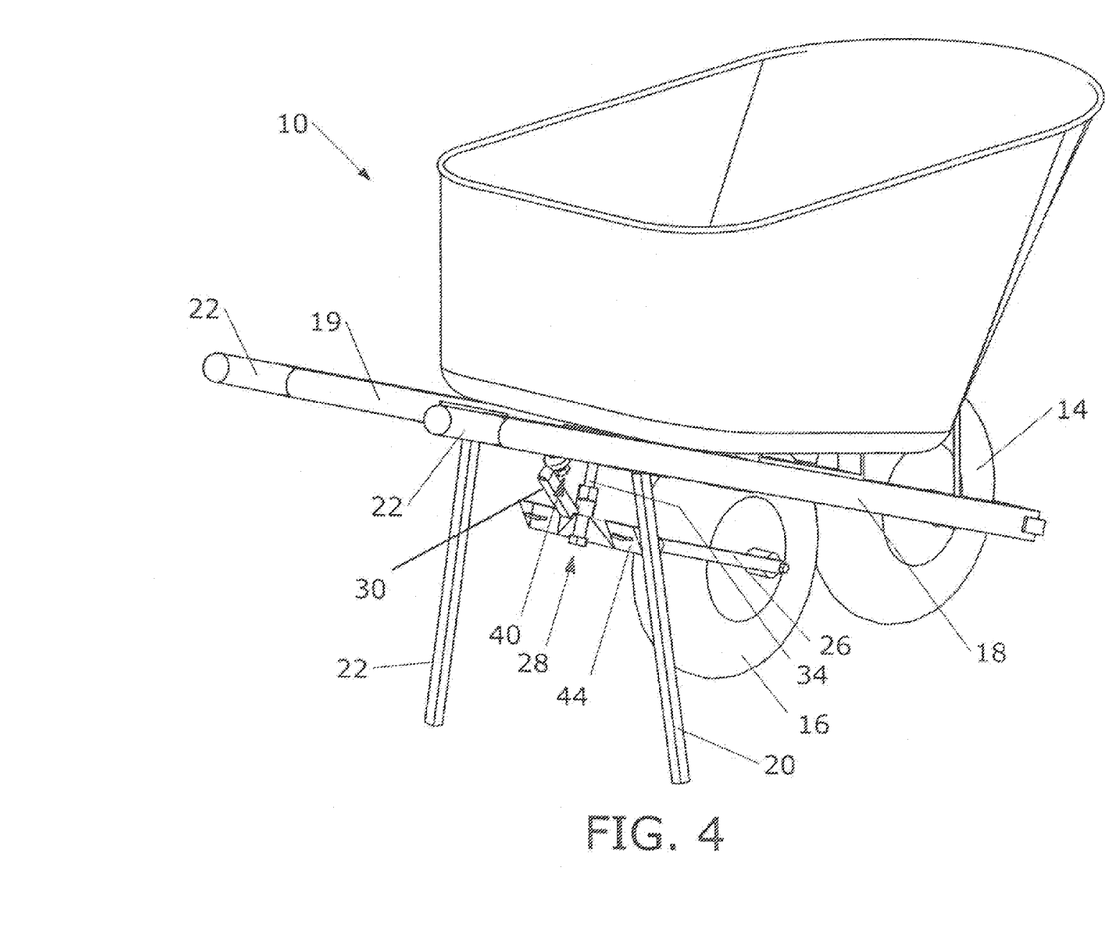
FIG. 4 is a perspective view, showing the present invention.

FIG. 4 shows a rear perspective view of wheelbarrow 10 in a position with back wheel 16 retracted (first position). As shown, assembly 28 includes mounting plate 44, joint 38, mounting shaft 34, member 30, and spherical joint 40. Assembly 28 attaches back wheel fork 26 and back wheel 16 to chassis 24 (not shown in the current view) and allows wheelbarrow 10 to easily turn while in use.

Figure 5:
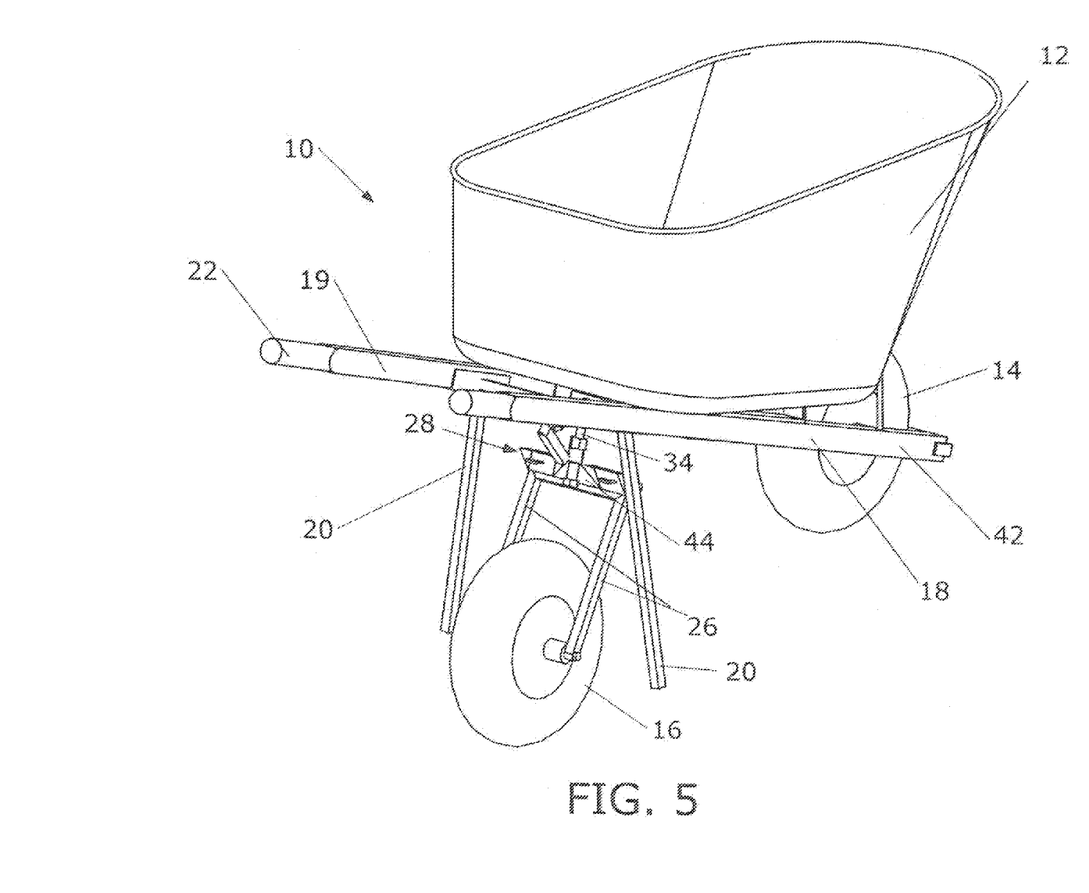
FIG. 5 is a perspective view, showing the present invention.

FIG. 5 also shows a rear perspective view of wheelbarrow 10 wherein back wheel 16 is fully extended (second position). Legs 20 are elevated in order to allow the user to push wheelbarrow 10 using front wheel 14 and back wheel 16. Now comparing FIG. 4 to FIG. 5, the reader will note that although back wheel 16 and back wheel fork 26 have rotated, assembly 28 has not moved. The position of mounting plate 44 and mounting shaft 34 remain relatively the same, it is preferable that (apart from the turning aspect discussed in the subsequent text) hinge joint 38 (shown in FIG. 6) and back fork 26 be the only moving parts during extension of back wheel 16.

Figure 6:
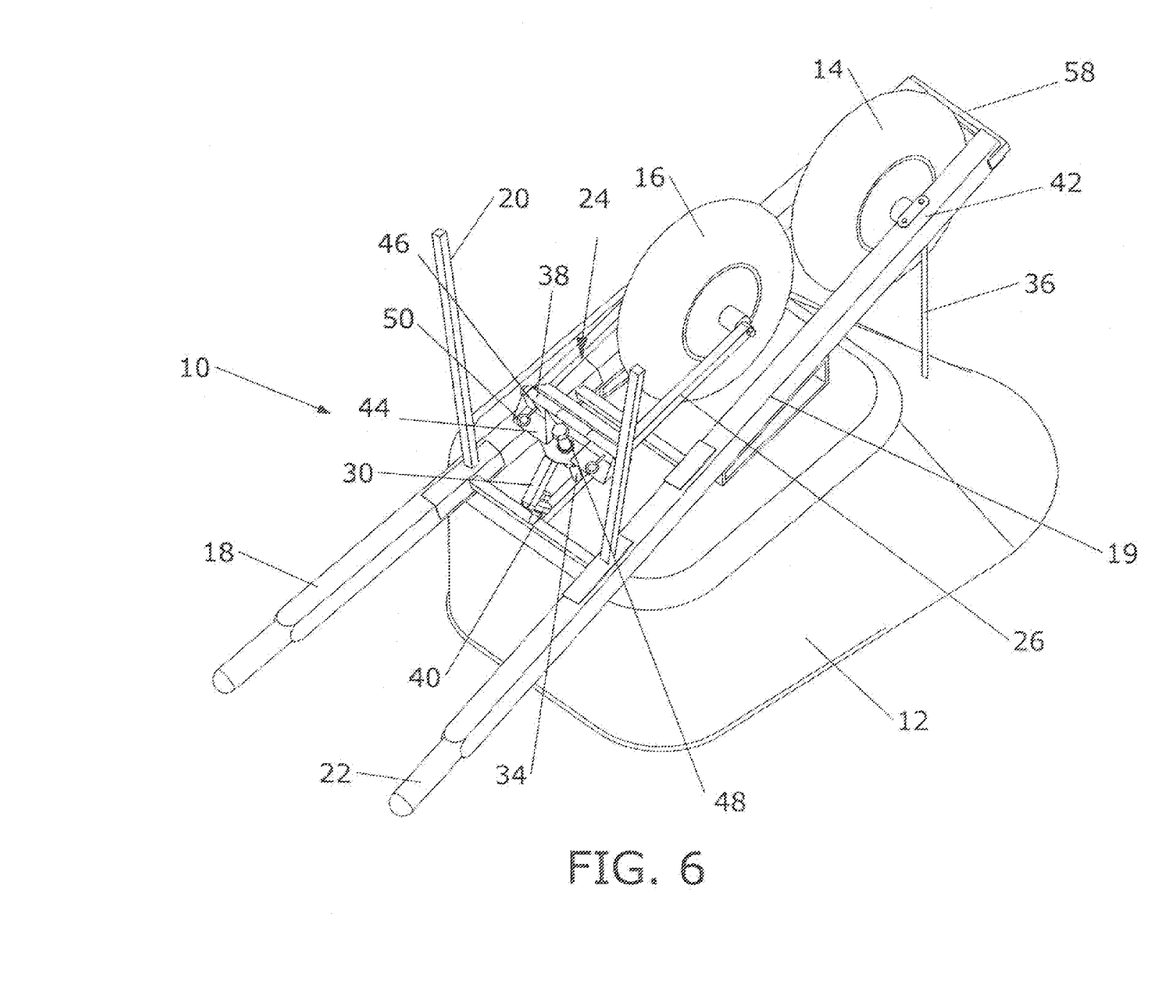
FIG. 6 is a perspective view, showing the present invention inverted.

In a preferred embodiment of the present invention, chassis 24 connects many of the components of wheelbarrow 10, as shown in FIG. 6. First handle 18, second handle 19, receptacle 12, front wheel fork 42, and legs 20 are attached to chassis 24. In some embodiments, first handle 18, second handle 19, legs 20, front wheel fork 42, and chassis 24 are a single part. This could be a single weld or molded part. These parts together form the structure of wheelbarrow 10. As shown, hinge joint 38 is a simple barrel hinge joint, which allows back wheel fork 26 to easily rotate around the hinge axis. As discussed in the preceding text, mounting, plate 44 includes fork stop 46. Fork stop 46 preferably prevents back wheel fork 26 from rotating beyond mounting plate 44. Mounting plate 44 also includes opening 48. Mounting shall 34 fits through opening 48. Opening 48 is preferably larger than mounting shaft 34—large enough that mounting plate 44 is capable of tilting within the perpendicular plane to the axial direction of shaft 34. Those familiar with the art will note that shear forces created by mounting plate 44 tilting about shaft 34 would likely break shaft 34. However, if opening 48 is larger than shaft 34 or in the shape of an oval, then shaft 34 is able to move within opening 48.

In addition, mounting plate 44 includes locking pins 50. Preferably, locking pins 50 affix hack wheel 16 and back wheel fork 26 in place. This is achieved by rotating pins 50 (which are threaded into fork stop 46) until pins 50 engage hinge joint 38, thereby preventing fork 26 from rotating. The user can lock back wheel 16 in a retracted (shown in FIG. 6) or fully extended (shown in FIG. 5) position. A user may want to lock back wheel 6 in the retracted position in order to transport wheelbarrow 10. On the other hand, the user may want to lock back wheel 16 in the fully extended position if he or she is travelling down a steep hill or over very rough terrain.

Preferably, member 30 is rigidly connected to mounting plate 44 and spherical joint 40. As discussed, opening 48 allows mounting shaft 34 to tilt about mounting plate 44. Spherical joint 40 comprises a pivot and a pivot cup. When a lateral force is applied member 30, spherical joint 40 allows member 30 to pivot with three degrees of freedom. However, member 30 is also rigidly connected to mounting plate 44, thereby further restricting the movement of member 30 within spherical joint 40.

Figure 7:
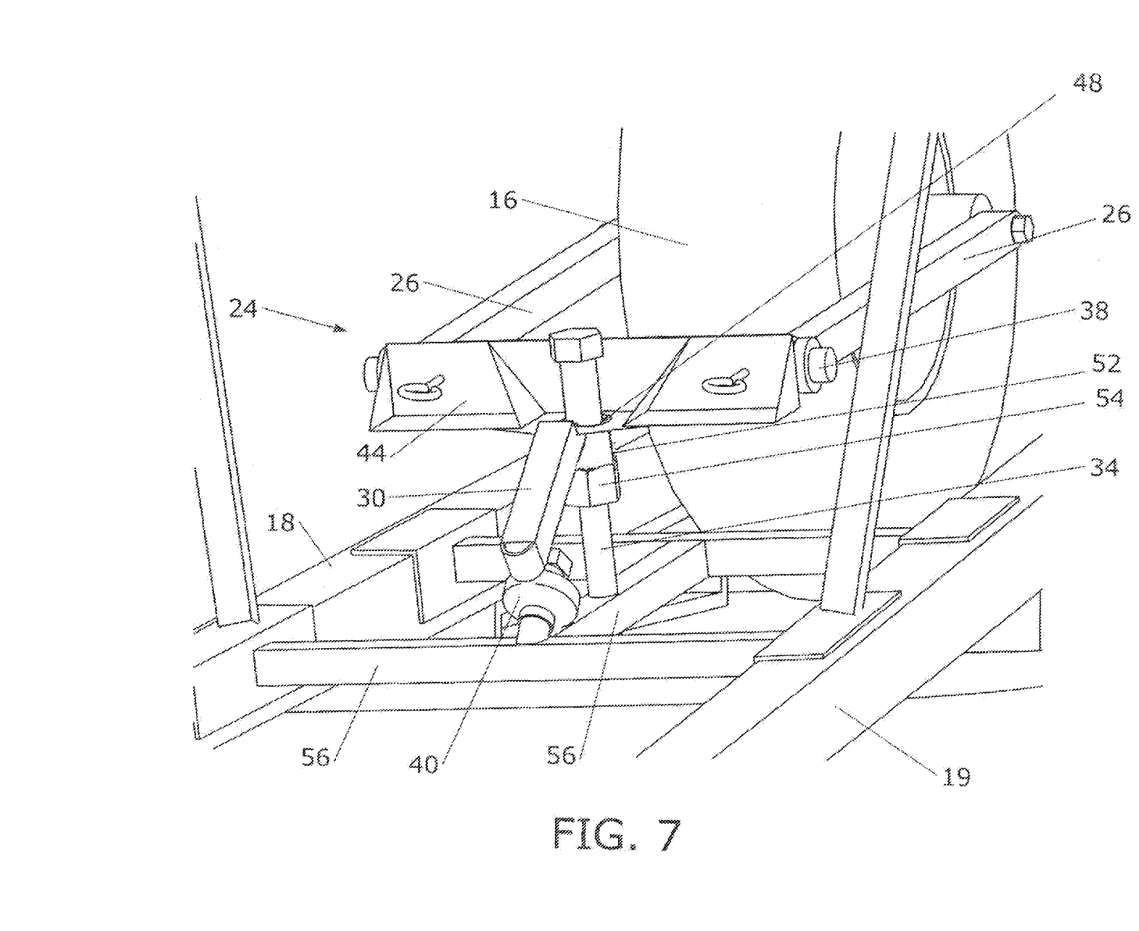
FIG. 7 is a perspective view, showing an exploded view of the back wheel connected to the frame assembly of the present invention.

FIG. 7 shows a detailed view of the present invention. As shown, mounting shaft 34 and spherical joint 40 are mounted to chassis member 56 (making up chassis 24). A large rubber bushing 52 is attached to mounting shaft 34. Bushing 52 is tightly fixed to mounting plate 44 via nut 54. The connection between bushing 52, mounting shaft 34, mounting plate 44, member 30, spherical joint 40, hinge joint 38, back wheel fork 26, and back wheel 16 allow the user to easily turn wheelbarrow 10 while pushing it. In order to initiate a right-hand turn, the user can either three the right-hand handle 18 down or lift up on the left-hand handle. The load causes spherical joint 40 to pivot, which forces member 30 to pivot. This then forces mounting plate 44 to tilt, thereby compressing bushing 52. The reader will note that because to opening 48 is larger than shaft 34, mounting plate 44 can easily tilt without affecting shaft 34. Of course, as mounting plate 34 is tilted, back wheel fork 26 pivots, thereby causing wheelbarrow 10 to turn. The reader will also note that opening 48 has been exaggerated for the sake of explanation.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

Having described my invention, I claim:

1. A wheelbarrow for use on a surface, said wheelbarrow comprising:
    a first handle and a second handle having a first end and a second end;
    a chassis connecting said first handle to said second handle;
    a receptacle connected to said first handle and said second handle;
    at least one leg connected to said first and second handles
    a front wheel attached to said first handle and said second handle;
    a back wheel and a back wheel fork attached to said chassis via an assembly such that said back wheel is capable of pivoting between a first position and a second position;
    wherein when said back wheel is in said first position, said at least one leg is in contact with said surface;
    wherein when said back wheel is in said second position, said at least one leg is raised off of said surface;
    wherein said assembly comprises a member, mounting shaft, joint and a spherical joint attached to said chassis and said member of said assembly.

2. The wheelbarrow as recited in claim 1, wherein said front wheel is attached to said first handle and said second handle by a front wheel fork.

3. The wheelbarrow as recited in claim 1, wherein said first handle has a grip and said second handle has a grip proximate said first end of said first and second handle.

4. The wheelbarrow as recited in claim 1, wherein said assembly further comprises a mounting plate configured to engage said back wheel fork thereby preventing said back wheel from rotating beyond said second position.

5. A wheelbarrow for use on a surface, said wheelbarrow comprising:
    a first handle and a second handle having a first end and a second end;
    a chassis connecting said first handle to said second handle;
    a receptacle connected to said first handle and said second handle;
    at least one leg connected to said first and second handles
    a front wheel attached to said first handle and said second handle;
    a back wheel and a back wheel fork attached to said chassis via an assembly such that said back wheel is configured to pivot between a first position and a second position;
    wherein when said back wheel is in said first position, said at least one leg is in contact with said surface;
    wherein when said back wheel is in said second position, said at least one leg is raised off of said surface; and
    wherein said assembly comprises:
        a mounting shaft attached to said chassis;
        a nut attached to said mounting shaft;
        a bushing attached to said mounting shaft proximate said nut;
        a mounting plate having an opening for said mounting shaft;
        a joint connecting said mounting plate to said back wheel fork;
        a spherical joint attached to said chassis; and
        a member attached to said mounting plate on a first end and said spherical joint on a second end.

6. A wheelbarrow for use on a surface, said wheelbarrow comprising:
    a first handle and a second handle having a first end and a second end;
    a chassis connecting said first handle to said second handle;
    a receptacle connected to said first handle and said second handle;
    a plurality of legs connected to said chassis;
    a front wheel attached to said first handle and said second handle by a front wheel fork;
    a back wheel and a back wheel fork attached to said chassis via an assembly such that said back wheel is configured to pivot between a first position and a second position;
    wherein when said back wheel is in said first position, said at least one leg is in contact with said surface;
    wherein when said back wheel is in said second position, said at least one leg is raised off of said surface; and
    wherein said assembly comprises:
        a mounting shaft attached to said chassis;
        a nut attached to said mounting shaft;
        a bushing attached to said mounting shaft proximate said nut;
        a mounting plate having an opening for said mounting shaft;
        a joint connecting said mounting plate to said back wheel fork;
        a spherical joint attached to said chassis; and a member attached to said mounting plate on a first end and said spherical joint on a second end.

7. The wheelbarrow as recited in claim 6, wherein said first handle has a grip and said second handle has a grip proximate said first end of said first and second handle.

8. The wheelbarrow as recited in claim 6, wherein said back wheel fork is configured to pivot about said joint.

9. A wheelbarrow for use on a surface, said wheelbarrow comprising:
- a first handle and a second handle having a first end and a second end;
- wherein said second end of first handle is connected to said second end of second handle by a crossbar;
- a receptacle connected to said first handle and said second handle;
- a chassis attached to said first handle to said second handle;
- at least one leg connected to said chassis;
- a front wheel attached to said first handle and said second handle via a front wheel fork;
- a back wheel and a back wheel fork attached to said chassis via an assembly such that said back wheel is configured to pivot between a first position and a second position;
- wherein when said back wheel is in said first position, said at least one leg is in contact with said surface;
- wherein when said back wheel is in said second position, said at least one leg is raised off of said surface; and
- wherein said assembly comprises:
  - a mounting shaft attached to said chassis;
  - a nut attached to said mounting shaft;
  - a bushing attached to said mounting shaft proximate said nut;
  - a mounting plate having an opening for said mounting shaft;
  - a joint connecting said mounting plate to said back wheel fork;
  - a spherical joint attached to said chassis; and
  - a member attached to said mounting plate on a first end and said spherical joint on a second end.

10. The wheelbarrow as recited in claim 9, wherein said first handle has a grip and said second handle has a grip proximate said first end of said first and second handle.

* * * * *